(12) United States Patent
Iizawa et al.

(10) Patent No.: US 11,590,870 B2
(45) Date of Patent: Feb. 28, 2023

(54) SEAT

(71) Applicant: PIONEER CORPORATION, Tokyo (JP)

(72) Inventors: Takashi Iizawa, Kawagoe (JP); Tatsuya Fukuda, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 13 days.

(21) Appl. No.: 16/642,497

(22) PCT Filed: Aug. 28, 2018

(86) PCT No.: PCT/JP2018/031759
§ 371 (c)(1),
(2) Date: Feb. 27, 2020

(87) PCT Pub. No.: WO2019/044824
PCT Pub. Date: Mar. 7, 2019

(65) Prior Publication Data
US 2020/0180485 A1    Jun. 11, 2020

(30) Foreign Application Priority Data

Aug. 31, 2017  (JP) .............................. JP2017-167499

(51) Int. Cl.
*B60N 2/90*        (2018.01)
*B60N 2/64*        (2006.01)

(52) U.S. Cl.
CPC .................. *B60N 2/90* (2018.02); *B60N 2/64* (2013.01); *B60N 2002/981* (2018.02)

(58) Field of Classification Search
CPC ...... B60N 2/90; B60N 2/64; B60N 2002/981; B60N 2/976
See application file for complete search history.

(56) References Cited

U.S. PATENT DOCUMENTS 4,641,345 A * 2/1987 Takahashi .............. H04R 9/066
381/86
4,967,871 A * 11/1990 Komatsubara ..... A61H 23/0236
181/161

(Continued)

FOREIGN PATENT DOCUMENTS

CN      206551915 U  * 10/2017
DE   102007016998 A1   10/2007

(Continued)

OTHER PUBLICATIONS

European Search Report issued in European Patent Application No. 18 85 1236.2 dated Mar. 29, 2021.

(Continued)

*Primary Examiner* — David E Allred
(74) *Attorney, Agent, or Firm* — Nixon & Vanderhye

(57) ABSTRACT

A seat includes a seating portion, a backrest, two pairs of vibrators and a vibration absorbing member, and constitutes a driver's seat of a vehicle. The vibration absorbing member is arranged at a boundary portion between a first region and a second region of the seating portion, and is arranged at an intermediate portion between the pair of vibrators. The vibration absorbing member suppresses vibration of the vibrator from being propagated to the second region and vibration of the vibrator from being propagated to the first region. The vibration absorbing member is arranged at a boundary portion between a first region and a second region of the backrest, and is arranged at an intermediate portion between the pair of vibrators. The vibration absorbing member suppresses vibration of the vibrator from being propagated to the second region and vibration of the vibrator from being propagated to the first region.

12 Claims, 7 Drawing Sheets

(56) References Cited

U.S. PATENT DOCUMENTS

| | | | |
|---|---|---|---|
| 6,682,494 | B1 | 1/2004 | Sleichter, III et al. |
| 7,862,113 | B2 * | 1/2011 | Knoll .................. B60N 2/66 297/180.13 |
| 2007/0241595 | A1 | 10/2007 | Nathan et al. |
| 2013/0341977 | A1 | 12/2013 | Kiefer et al. |
| 2017/0232876 | A1 | 8/2017 | Shimoda |
| 2019/0084452 | A1 * | 3/2019 | Hagedorn ............ B60N 2/90 |
| 2019/0271370 | A1 * | 9/2019 | Nishizawa ........... B60N 2/64 |
| 2020/0070696 | A1 * | 3/2020 | Friderich ............ F04D 1/04 |
| 2020/0184822 | A1 * | 6/2020 | Fukuda .............. B60K 35/00 |
| 2021/0062885 | A1 * | 3/2021 | Nishizawa ........... B60N 2/64 |
| 2021/0241596 | A1 * | 8/2021 | Yasushi ............. B06B 1/0284 |
| 2021/0316646 | A1 * | 10/2021 | Mergl ................ A61H 23/02 |

FOREIGN PATENT DOCUMENTS

| | | | | |
|---|---|---|---|---|
| DE | 10 2013 210 785 | A1 | | 12/2013 |
| FR | 2849814 | A1 * | 7/2004 | ............ B60N 2/64 |
| GB | 2437158 | A | | 10/2007 |
| JP | 2011-048566 | A | | 3/2011 |
| JP | 2017214006 | A * | 12/2017 | |
| KR | 10-2012-0044009 | A | | 5/2012 |
| WO | 2016/024379 | A1 | | 2/2016 |

OTHER PUBLICATIONS

Notice of Reasons for Refusal issued in Japanese Patent Application No. 2019-539526 dated Jan. 12, 2021, with English translation provided.

International Search Report, dated Oct. 2, 2018, from corresponding PCT application No. PCT/JP2018/031759.

\* cited by examiner

SEAT

TECHNICAL FIELD

The present invention relates to a seat including a vibrator.

BACKGROUND OF THE INVENTION

Conventionally, there has been proposed an information presentation system in which a vibrator is provided to a seat of a vehicle and such and the vibrator is vibrated to transmit information of some kind to a seated person (e.g., see Patent Document 1). Further, Patent Document 1 discloses an information presentation system that detects a hazardous object around an own vehicle (i.e., obstacles such as other vehicle, a person, a fixed object), and presents to a driver information about a direction of the hazardous object (a direction in which the hazardous object is present or moving) using a plurality of vibrators in accordance with the state of the own vehicle and the hazardous object (such as position and/or speed).

PRIOR ART DOCUMENT

Patent Document

Patent Document 1: JP 2011-48566 A

SUMMARY OF THE INVENTION

Problem to be Solved by the Invention

There is a problem in the aforementioned seat having the vibrator arranged therein that, since the vibration by the vibrator arranged in a predetermined region is propagated to another region, the seated person could mistake the position of the vibration source and thus the presented information may not be recognized correctly.

Accordingly, an object of the present invention, as one example, is to provide a seat that can allow a seated person to recognize a position of a vibration source as accurately as possible.

Solution to Problem

In order to achieve the above-mentioned object, the present invention provides, in a first aspect, a seat having a first region and another region, including a first vibrator arranged in the first region and a propagation suppressor that suppresses vibration of the first vibrator from being propagated to the another region.

DESCRIPTION OF EMBODIMENTS

In the following, an embodiment of the present invention will be explained. A seat according to an embodiment of the present invention has a first region and another region, and includes a first vibrator arranged in the first region and a propagation suppressor that suppresses the vibration of the first vibrator from being propagated to the another region. Such configuration can allow a seated person to more accurately recognize a position of a vibration source.

Further, the propagation suppressor may be a vibration absorbing member provided around the first vibrator. Such configuration can limit the vibration range of the first vibrator to a narrow range, allowing the seated person to more accurately recognize the position of the vibration source.

Further, the seat according to the embodiment of the present invention may further include a second vibrator arranged in another region, and the propagation suppressor may be configured to suppress the vibration of the second vibrator from being propagated to the first region.

Further, the propagation suppressor may be a vibration absorbing member provided around the second vibrator. Such configuration can limit the vibration range of the second vibrator to a narrow range, allowing the seated person to more accurately recognize the position of the vibration source.

Further, the propagation suppressor may be a vibration absorbing member arranged inside the seat at a central portion in a width direction of the seat. According to such configuration, when the first vibrator is arranged on one side in the width direction of the seat and the second vibrator is arranged on the other side, the propagation of unwanted vibration of the first vibrator and unwanted vibration of the second vibrator can be suppressed with a single vibration absorbing member, and thereby, the number of parts of the seat can be reduced.

Further, the propagation suppressor may be a dividing groove that divides an inner member of the seat into right and left portions at the central portion in the width direction of the seat. With such configuration, the propagation of unwanted vibration can be suppressed without using a dedicated vibration absorbing member, and thereby, the number of parts of the seat can be reduced.

Further, the seat according to the embodiment of the present invention may be configured to be mounted as a seat of a vehicle.

EXAMPLES

Example 1

Figure 1:
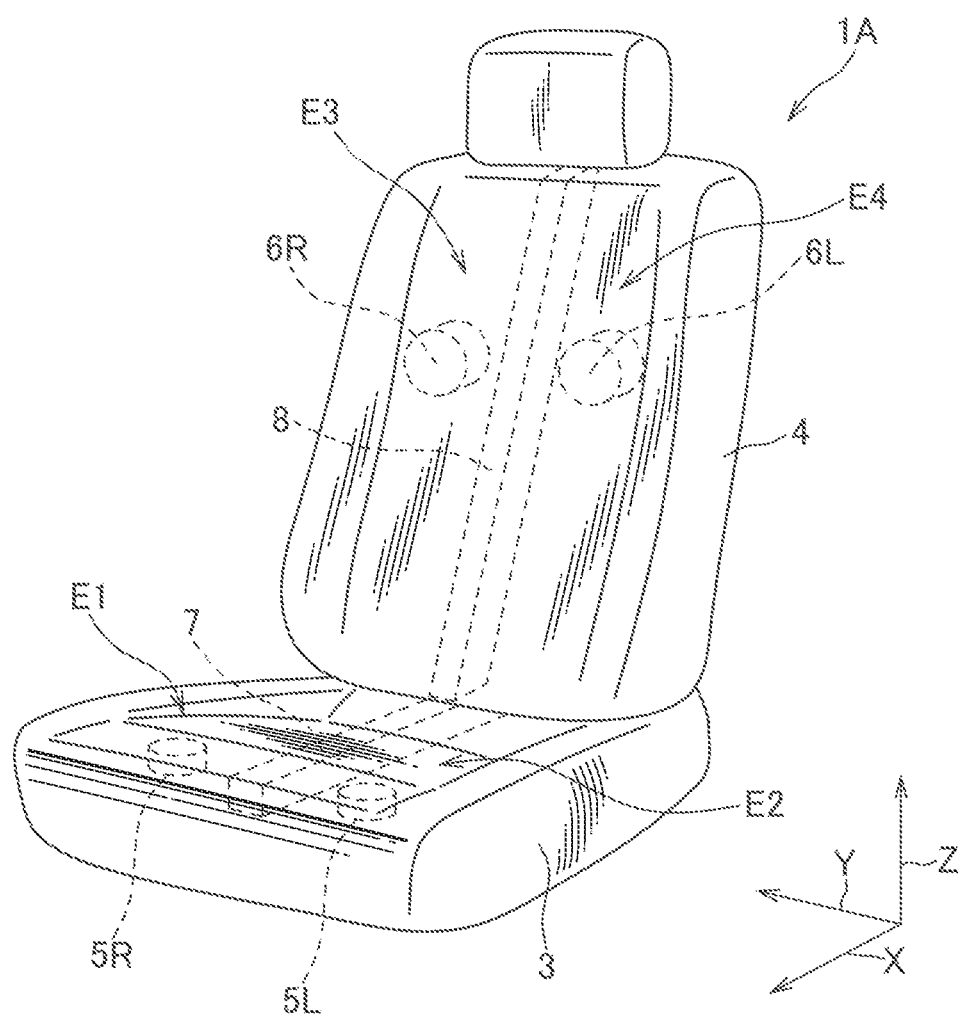
FIG. 1 is a perspective view showing a seat according to Example 1 of the present invention.
Figure 2:
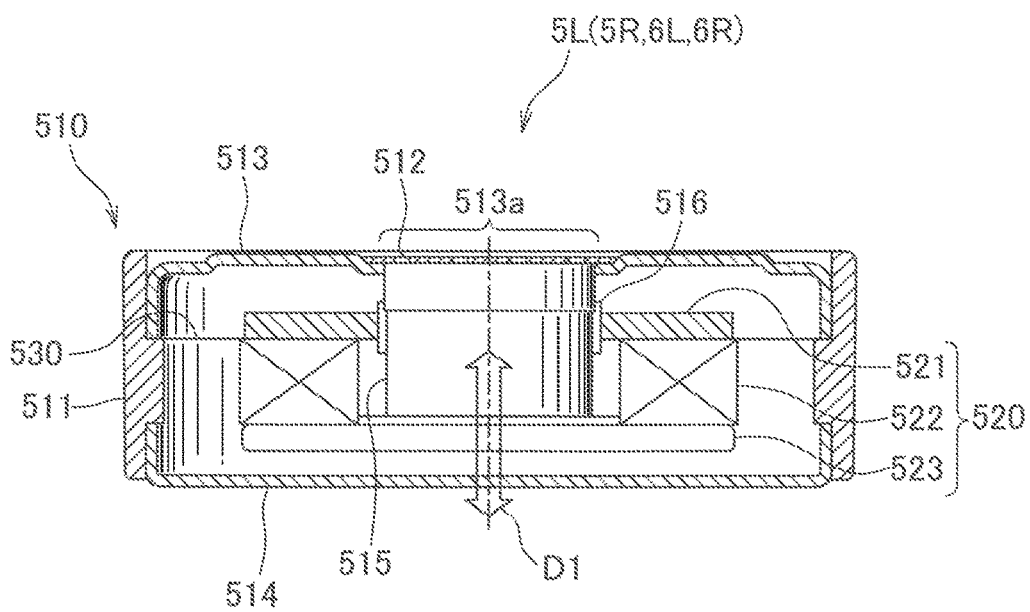
FIG. 2 is a perspective view showing a vibrator provided to the seat of FIG. 1.

Referring to FIGS. 1 and 2, "seat" according to Example 1 of the present invention will be explained. A seat 1A shown in FIG. 1 includes a seating portion 3, a backrest 4, two pairs of vibrators 5L, 5R, 6L, 6R, vibration absorbing members (propagation suppressor) 7, 8, and a controller, and constitutes a driver's seat of a vehicle. An arrow X shown in FIG. 1 and in other figures is a front-rear direction of the seat 1A, an arrow Y is a width direction of the seat 1A, and an arrow Z is an up-down direction of the seat 1A.

The seating portion 3 is for supporting buttocks and thighs of the seated person, and has a sheet member constituting a surface thereof and a cushioning member (cushion member) provided to an inner side of the sheet member and such. When viewed from a seating surface, the seating portion 3 has a first region E1 and a second region E2. The first region E1 is a right half of the seating portion 3 (i.e., the right half as viewed by the seated person seated on the seat 1A). The second region E2 is a left half of the seating portion 3 (i.e., the left half as viewed by the seated person seated on the seat 1A).

The backrest 4 extends so as to intersect with respect to an upper surface of the seating portion 3, and includes a sheet member constituting a surface thereof and a cushioning member (cushion member) provided on the inner side of the sheet member and such. The cushioning members of the seating portion 3 and the backrest 4 are made of, for example, urethane foam. When viewed from the seating surface, the backrest 4 has a first region E3 and a second region E4. The first region E3 is a right half of the backrest 4 (i.e., the right half as viewed from a seated person seated on the seat 1A). The second region E4 is a left half of the backrest 4 (i.e., the left half as viewed from the seated person seated on the seat 1A).

The term "seating surface" refers to a surface that is in contact with the seated person when the seated person has sat on the seat, and corresponds to the upper surface of the seating portion 3 and a front surface of the backrest 4.

The vibrator (first vibrator) 5R is arranged in the first region E1 inside the cushioning member of the seating portion 3. The vibrator (second vibrator) 5L is arranged in the second region E2 inside the cushioning member of the seating portion 3. The vibrator (first vibrator) 6R is arranged in the first region E3 inside the cushioning member of the backrest 4. The vibrator (second vibrator) 6L is arranged in the second region E4 inside the cushioning member of the backrest 4.

The two pairs of vibrators 5L, 5R, 6L, 6R are identical in configuration, and as shown in FIG. 2, they include a magnetic circuit 520 accommodated in a case 510. The case 510 has a cylindrical frame 511 which is low in height and which has an opening at one end side closed by a circular first plate wall 513 provided with a plurality of through holes 512 at a central portion, and an opening at the other end side closed by a circular second plate wall 514.

A cylindrical bobbin 515 is provided at a substantially center of the first plate wall 513 so a to stand toward the second plate wall 514 so as to surround the plurality of through holes 512 and, a voice coil 516 is provided on an outer circumference of the bobbin 515. In this manner, the voice coil 516 is fixed to the first plate wall 513 via the bobbin 515. Further, the plurality of through holes 512 are provided in a region 513a corresponding to an inner side of the voice coil 516 in a plan view viewed from a direction intersecting the first plate wall 513.

The magnetic circuit 520 includes a plate 521 and a magnet 522 which are formed into a ring-like shape, and a disk-shaped yoke 523. The plate 521 and the magnet 522 are arranged coaxially with respect to the voice coil 516 with a gap. The plate 521, thus the magnetic circuit 520, is supported on an inner wall face of the cylindrical frame 511 via a damper 530 in a manner capable of vibrating in a contacting/separating direction D1 with respect to the first plate wall 513.

When an AC signal is transmitted to the voice coil 516, the magnetic circuit 520 vibrates in the contacting/separating direction D1 with respect to the first plate wall 513. Also, due to the reaction from that vibration applied via the damper 530, the case 510 is vibrated.

Although the vibrator 5L, 5R, 6L, 6R of this example has a magnetic circuit configuration of an external magnet type, the configuration of the vibrator is not limited thereto, and it may have a magnetic circuit configuration of an inner magnet type, for example.

The vibrator 5L, 5R, 6L, 6R is arranged such that the first plate wall 513 faces the seated person side. Further, in the seating portion 3, the pair of vibrators 5L, 5R is arranged in a line-symmetrical manner with respect to a central axis that passes through a widthwise center of the seating portion 3 and that is parallel to the front-rear direction of the seat 1A. Similarly, in the backrest 4, the pair of vibrators 6L, 6R is arranged in a line-symmetrical manner with respect to a central axis that passes through a widthwise center of the backrest 4 and that is parallel to a direction from a lower end to an upper end of the backrest 4.

The vibration absorbing member 7 is formed into a quadrangular prism-like shape and is arranged inside the seating portion 3 at the central portion in the width direction of the seating portion 3. Further, a longitudinal direction of the vibration absorbing member 7 coincides with the front-rear direction of the seat 1A. That is, the vibration absorbing member is arranged along the central axis that passes through the widthwise center of the seating portion 3 and that is parallel to the front-rear direction of the seat 1A. That is, the vibration absorbing member 7 is arranged at a boundary portion of the first region E1 and the second region E2 of the seating portion 3 and is arranged at an intermediate portion between the pair of the vibrators 5L, 5R. The vibration absorbing member 7 is composed of a material in which vibration is not likely to be propagated to the cushioning member inside the seating portion 3, and in this example, it is composed of urethane foam.

Further, in this example, the vibration absorbing member 7 has a dimension in a thickness direction of the seating portion 3 that is comparable to a thickness of the vibrator 5L, 5R (i.e., a dimension of the cylindrical frame 511 in the arrow D1 direction shown in FIG. 2); however, the dimension of the vibration absorbing member 7 in the thickness direction of the seating portion 3 may be changed appropriately, and it may be comparable to the thickness of the seating portion 3.

The vibration absorbing member 7 as described above suppresses the vibration of the vibrator 5R from being propagated to the second region E2, and also suppresses the vibration of the vibrator 5L from being propagated to the first region E1.

The vibration absorbing member 8 is formed into a quadrangular prism shape and is arranged inside the backrest 4 at the central portion in the width direction of the backrest 4. Further, a longitudinal direction of the vibration absorbing member 8 coincides with the direction from a lower end to an upper end of the backrest 4. That is, the vibration absorbing member 8 is arranged along the central axis that passes through the widthwise center of the backrest 4 and that is parallel to the direction from the lower end to the upper end of the backrest 4. That is, the vibration absorbing member 8 is arranged at a boundary portion of the first region E3 and the second region E4 of the backrest 4, and is arranged at an intermediate portion between the pair of vibrators 6L, 6R. The vibration absorbing member 8 is composed of a material in which vibration is not likely to be propagated to the cushioning member inside the backrest 4. In this example, the vibration absorbing member 8 is composed of urethane foam.

Further, in this example, the vibration absorbing member 8 has a dimension in the thickness direction of the backrest 4 that is comparable to the thickness of the vibrator 6L, 6R (the dimension in the arrow D1 direction of the cylindrical frame 511 shown in FIG. 2); however the dimension of the vibration absorbing member 8 in the thickness direction of the backrest 4 may be changed appropriately and may be comparable to the thickness of the backrest 4.

The vibration absorbing member 8 as described above suppresses the vibration of the vibrator 6R from being propagated to the second region E4, and also suppresses the vibration of the vibrator 6L from being propagated to the first region E3.

The controller independently controls the vibration of each of the vibrators 5L, 5R, 6L, 6R by controlling the current flowing through the vibrators 5L, 5R, 6L, 6R. The controller performs control such as, when the own vehicle deviates from a lane during traveling, it notifies so by vibrating the vibrators 5L, 5R, 6L, 6R.

According to the seat 1A having the above-described configuration, the vibration generated by each of the vibrators 5L, 5R, 6L, 6R is propagated well to the seated person side but is suppressed from being propagated in the width direction of the seat 1A by the vibration absorbing members 7, 8, allowing the seated person to recognize the position of the vibration source more accurately. That is, whether the vibrating vibrator is the one on the right side or on the left side can be recognized more accurately. Consequently, it is possible to allow the seated person to correctly recognize the information meant by the vibration of each vibrator 5L, 5R, 6L, 6R. Further, the propagation of unwanted vibration of the vibrators 5R, 5L on the right side and the left side (the vibration propagating in the width direction of the seat 1A) can be suppressed with one vibration absorbing member 7, and the propagation of unwanted vibration of the vibrators 6R, 6L on the right side and the left side can be suppressed with one vibration absorbing member 8, thus the number of parts of the seat 1A can be reduced.

Example 2

Figure 3:
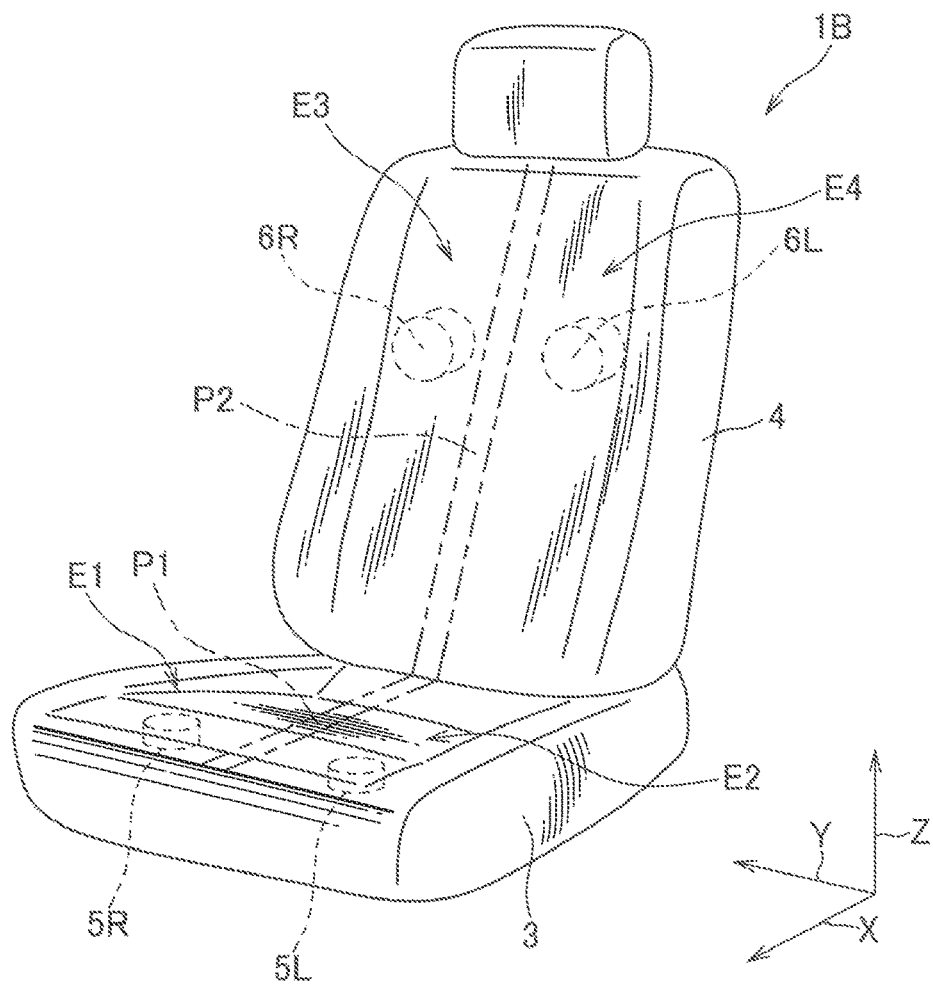
FIG. 3 is a perspective view showing a seat according to Example 2 of the present invention.

Referring to FIG. 3, "seat" according to Example 2 of the present invention will be explained. In FIG. 3, the same elements as Example 1 are denoted by the same reference signs to omit explanations thereof.

A seat 1B of this example shown in FIG. 3 includes a seating portion 3, a backrest 4, two pairs of vibrators 5L, 5R, 6L, 6R, a propagation suppressor and a controller, and constitutes a driver's seat of a vehicle as Example 1.

The propagation suppressor is a dividing groove P1 that divides a cushioning member inside the seating portion 3 into right and left portions at a central portion in a width direction of the seating portion 3, and a dividing groove P2 that divides a cushioning member inside the backrest 4 into right and left portions at a central portion in a width direction of the backrest 4. The dividing grooves P1, P2 are formed at positions corresponding to the vibration absorbing members 7, 8 of Example 1.

The dividing groove P1 is formed recessed from an upper surface of the cushioning member of the seating portion 3, and it is hollow inside the dividing groove P1. In this example, a depth of the dividing groove P1 (i.e., a depth of the seating portion 3 in a thickness direction) is compatible to a thickness of the vibrator 5L, 5R (i.e., a dimension of the cylindrical frame 511 in the arrow D1 direction in FIG. 2); however, the depth of the dividing groove P1 may be changed appropriately and may be formed throughout the entire region in the thickness direction of the cushioning member of the seating portion 3. Further, in the present invention, instead of the dividing groove P1, a cavity may be formed by hollowing out the central portion in the thickness direction of the cushioning member of the seating portion 3.

The dividing groove P1 as described above suppresses the vibration of the vibrator 5R from being propagated to the second region E2, and also suppresses the vibration of the vibrator 5L from being propagated to the first region E1.

The dividing groove P2 is formed recessed from a front surface of the cushioning member of the backrest 4, and it is hollow inside the dividing groove P2. In this example, a depth of the dividing groove P2 (i.e., a depth of the backrest 4 in a thickness direction) is compatible to a thickness of the vibrator 6L, 6R (i.e., a dimension of the cylindrical frame 511 in the arrow D1 direction in FIG. 2); however, the depth of the dividing groove P2 may be changed appropriately and may be formed throughout the entire region in the thickness direction of the cushioning member of the backrest 4. Further, in the present invention, instead of the dividing groove P2, a cavity may be formed by hollowing out the central portion in the thickness direction of the cushioning member of the backrest 4.

The dividing groove P2 as described above suppresses the vibration of the vibrator 6R from being propagated to the second region E4, and also suppresses the vibration of the vibrator 6L from being propagated to the first region E3.

According to the seat 1B having the above-described configuration, the vibration generated by each of the vibrators 5L, 5R, 6L, 6R is propagated well to the seated person side but is suppressed from being propagated in the width direction of the seat 1B by the dividing grooves P1, P2, allowing the seated person to recognize the position of the vibration source more accurately. That is, whether the vibrating vibrator is the one on the right side or on the left side can be recognized more accurately. Consequently, it is possible to allow the seated person to correctly recognize the information meant by the vibration of each vibrator 5L, 5R, 6L, 6R. Further, by forming the dividing grooves P1, P2 to the seating portion 3 and the backrest 4, the propagation of unwanted vibration of the vibrators 5R, 5L, 6L, 6R (i.e., the vibration that propagates in the width direction of the seat 1B) can be suppressed without using a dedicated vibration absorbing member as described in Example 1, thus the number of parts of the seat 1B can be reduced.

Example 3

Figure 4:
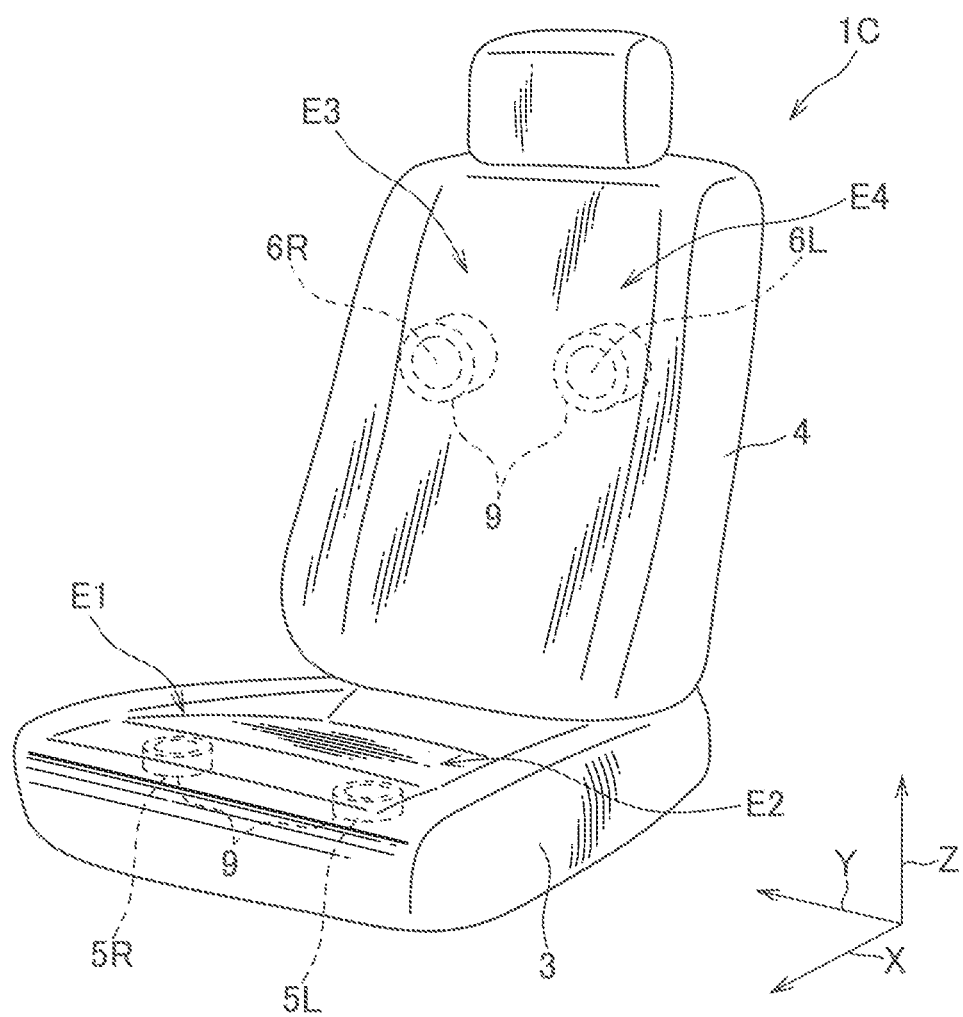
FIG. 4 is a perspective view showing a seat according to Example 3 of the present invention.
Figure 5:
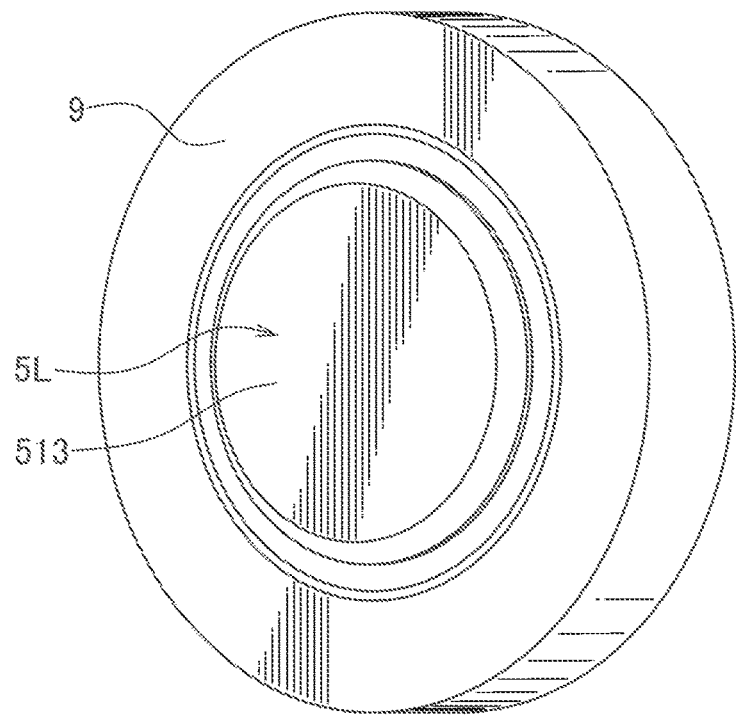
FIG. 5 is a perspective view showing a vibrator and a vibration absorbing member provided to the seat of FIG. 4.
Figure 6:
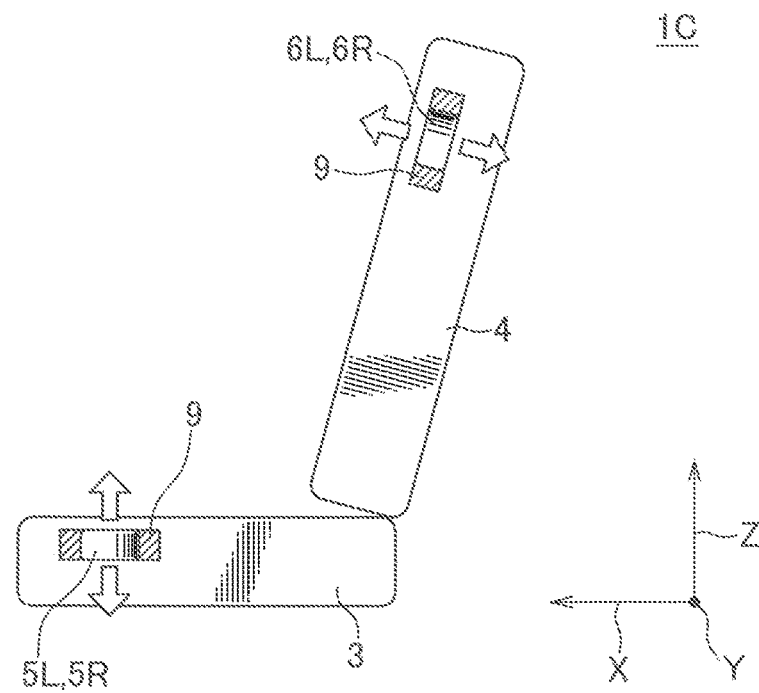
FIG. 6 is an illustration illustrating an effect at the seat of FIG. 4.

Referring to FIGS. 4 to 6, "seat" according to Example 3 of the present invention will be explained. In FIGS. 4 to 6, the same elements as Examples 1, 2 are denoted by the same reference signs to omit explanations thereof.

A seat 1C of this example shown in FIG. 4 includes a seating portion 3, a backrest 4, two pairs of vibrators 5L, 5R, 6L, 6R, a vibration absorbing member (propagation suppressor) 9 and a controller, and constitutes a driver's seat of a vehicle as Example 1.

As shown in FIG. 5, the vibration absorbing member 9 is formed into an annular shape and is provided around each vibrator 5L, 5R, 6L, 6R, i.e., to an outer circumferential portion of the cylindrical frame 511. In FIG. 5, only the vibration absorbing member 9 provided around the vibrator 5L is shown; however, the vibration absorbing members 9 provided around other vibrators 5R, 6L, 6R have the same configuration as the one shown in FIG. 5.

The vibration absorbing members 9 provided around the vibrators 5L, 5R are composed of a material in which vibration is not likely to be propagated to the cushioning member inside the seating portion 3, and in this example, it is composed of urethane foam. Further, in this example, the vibration absorbing member 9 provided around the vibrator 5L, 5R has a dimension in the thickness direction of the seating portion 3 that is compatible to the thickness of the vibrator 5L, 5R (i.e., a dimension of the cylindrical frame 511 in the arrow D1 direction in FIG. 2); however, the dimension of the vibration absorbing member 9 in the thickness direction of the seating portion 3 may be changed appropriately and may be compatible to the thickness of the seating portion 3. Further, the vibration absorbing member 9 covers an entire region of the outer circumferential face of the cylindrical frame 511 of the vibrator 5L, 5R.

The vibration absorbing member 9 provided around the vibrator 5R suppresses the vibration of the vibrator 5R located inside thereof from being propagated to the second region E2. The vibration absorbing member 9 provided around the vibrator 5L suppresses the vibration of the vibrator 5L located inside thereof from being propagated to the first region E1.

The vibration absorbing member 9 provided around the vibrator 6L, 6R is composed of a material in which vibration is not likely to be propagated to the cushioning member inside the backrest 4, and in this example, it is composed of urethane foam. Further, in this example, the vibration absorbing member 9 provided around the vibrator 6L, 6R has a dimension in the thickness direction of the backrest 4 that is compatible to the thickness of the vibrator 6L, 6R (i.e., a dimension of the cylindrical frame 511 in the arrow D1 direction in FIG. 2); however, the dimension of the vibration absorbing member 9 in the thickness direction of the backrest 4 may be changed appropriately and may be compatible to the thickness of the backrest 4. Further, the vibration absorbing member 9 covers an entire region of the outer circumferential face of the cylindrical frame 511 of the vibrator 6L, 6R.

The vibration absorbing member 9 provided around the vibrator 6R suppresses the vibration of the vibrator 6R located inside thereof from being propagated to the second region E4. The vibration absorbing member 9 provided around the vibrator 6L suppresses the vibration of the vibrator 6L located inside thereof from being propagated to the first region E3.

According to the seat 1C having the above-described configuration, the vibration generated by each of the vibrators 5L, 5R, 6L, 6R is propagated well to the seated person side but is suppressed from being propagated in a radial direction of the vibrators 5L, 5R, 6L, 6R by the vibration absorbing members 9 as shown in FIG. 6, allowing the seated person to recognize the position of the vibration source more accurately. That is, whether the vibrating vibrator is the one on the right side or on the left side can be recognized more accurately. Consequently, it is possible to allow the seated person to correctly recognize the information meant by the vibration of each vibrator 5L, 5R, 6L, 6R. Further, by providing the vibration absorbing member 9 around each vibrator 5L, 5R, 6L, 6R, the vibration range of each vibrator 5L, 5R, 6L, 6R can be limited to a narrow range, thereby allowing the seated person to recognize the position of the vibration source more accurately.

In Example 3 described above, the vibration absorbing members 9 are provided around all vibrators 5L, 5R, 6L, 6R; however, the present invention is not limited thereto, and the vibration absorbing member 9 may be provided around one of the pair of vibrators 5L, 5R, and the vibration absorbing member 9 may be provided to one of the pair of vibrators 6L, 6R. In this case also, an advantageous effect to some extent can be obtained in suppressing the propagation of unwanted vibration.

Modified Example of Example 3

Figure 7:
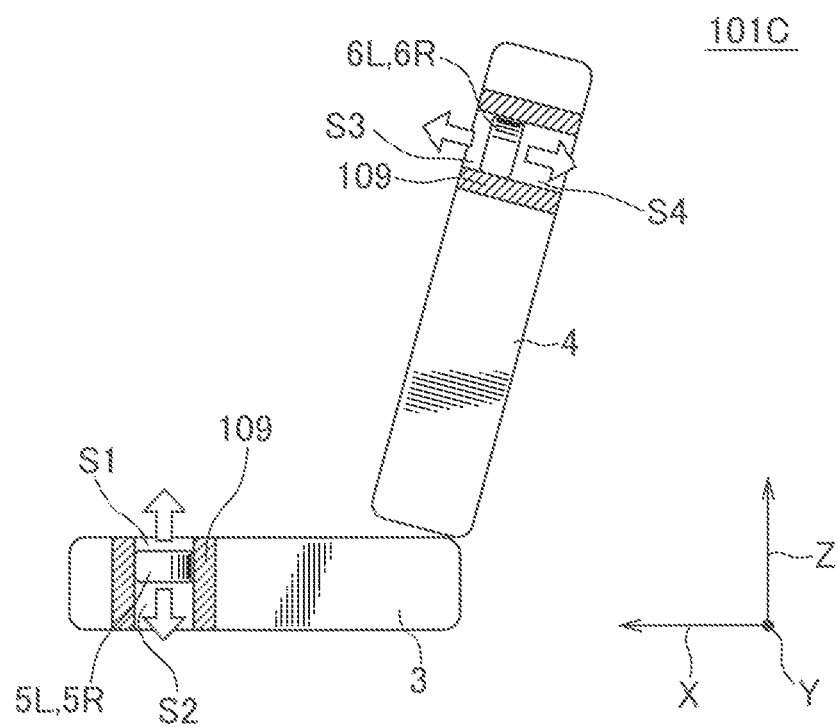
FIG. 7 is an illustration illustrating an effect at a seat according to a modified example of Example 3 of the present invention.

Referring to FIG. 7, "seat" according to a modified example of Example 3 of the present invention will be explained. In FIG. 7, the same elements as Example 3 are denoted by the same reference signs to omit explanations thereof.

A seat 101C shown in FIG. 7 includes a seating portion 3, a backrest 4, two pairs of vibrators 5L, 5R, 6L, 6R, a vibration absorbing member (propagation suppressor) 109 provided around each vibrator 5L, 5R, 6L, 6R, and a controller, and constitutes a driver's seat of a vehicle as Example 3.

The vibration absorbing member 109 has the same configuration as the vibration absorbing member 9 of Example 3 except that a dimension of the vibration absorbing member 109 in the thickness direction of the vibrator 5L, 5R, 6L, 6R is greater than that of the vibration absorbing member 9 of Example 3.

The vibration absorbing members 109 provided around the vibrators 5L, 5R are formed to have the thickness compatible to the thickness of the seating portion 3. Cavities S1, S2 are present inside the vibration absorbing members 109 above and below the vibrators 5L, 5R. In the present invention, these cavities S1, S2 may be filled with urethane foam and such or may be filled with a cushioning member made of the same material as the seating portion 3.

The vibration absorbing members 109 provided around the vibrators 6L, 6R are formed to have the thickness compatible to the thickness of the backrest 4. Cavities S3, S4 are present inside the vibration absorbing members 109 in front and back of the vibrators 6L, 6R. In the present invention, these cavities S3, S4 may be filled with urethane foam and such or may be filled with a cushioning member made of the same material as the backrest 4.

According to the seat 101C having the above-described configuration, with the vibration absorbing member 109 having the thickness greater than that of the vibration absorbing member 9 of Example 3, propagation of unwanted vibration of the vibrator 5L, 5R, 6L, 6R (i.e., the vibration propagating in the radial direction of the vibrator 5L, 5R, 6L, 6R) can be suppressed more than the vibration absorbing member 9 of Example 3.

Example 4

Figure 8:
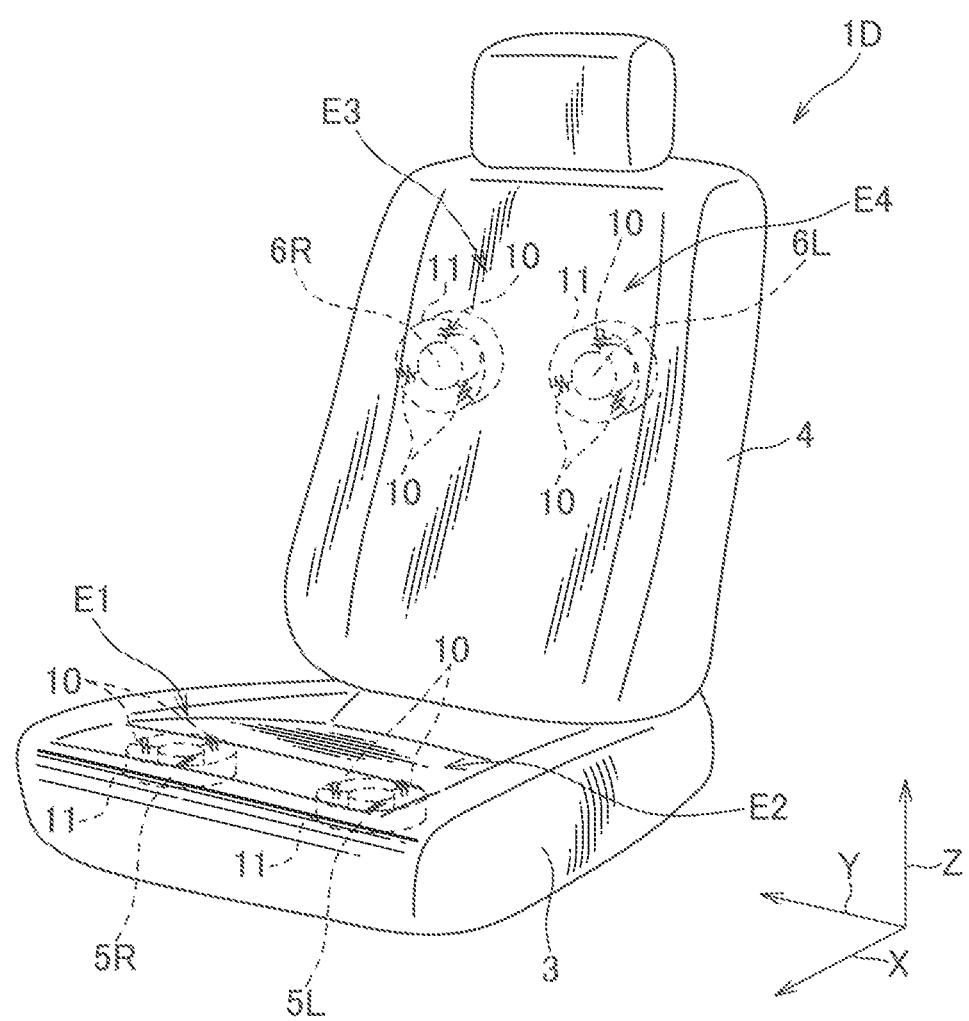
FIG. 8 is a perspective view showing a seat according to Example 4 of the present invention.
Figure 9:
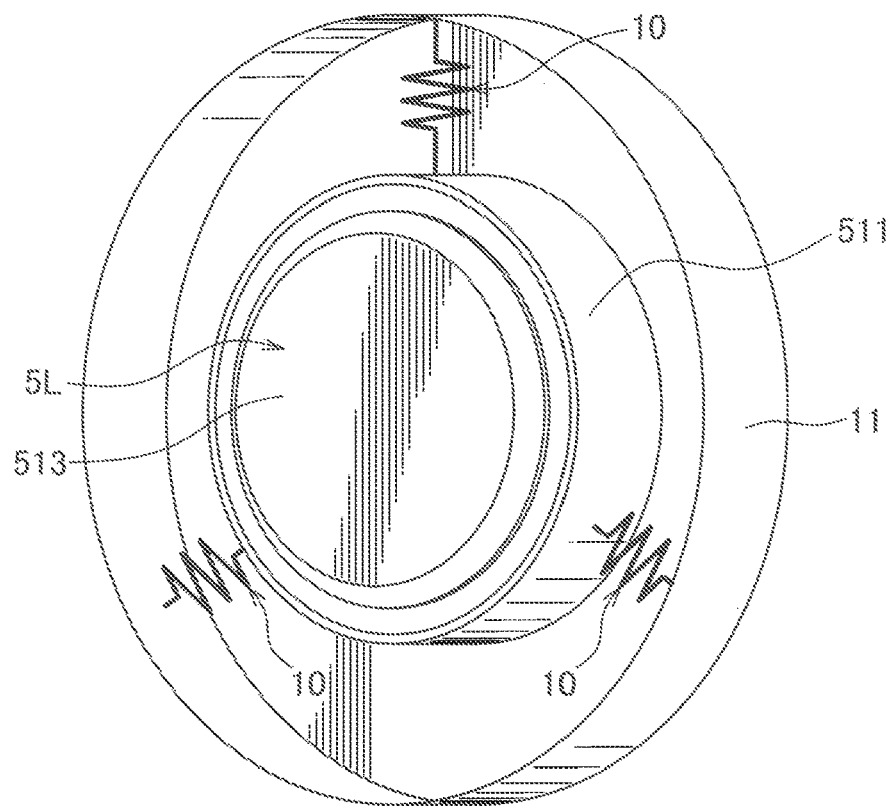
FIG. 9 is a perspective view showing a vibrator and a vibration absorbing member provided to the seat of FIG. 8.
Figure 10:
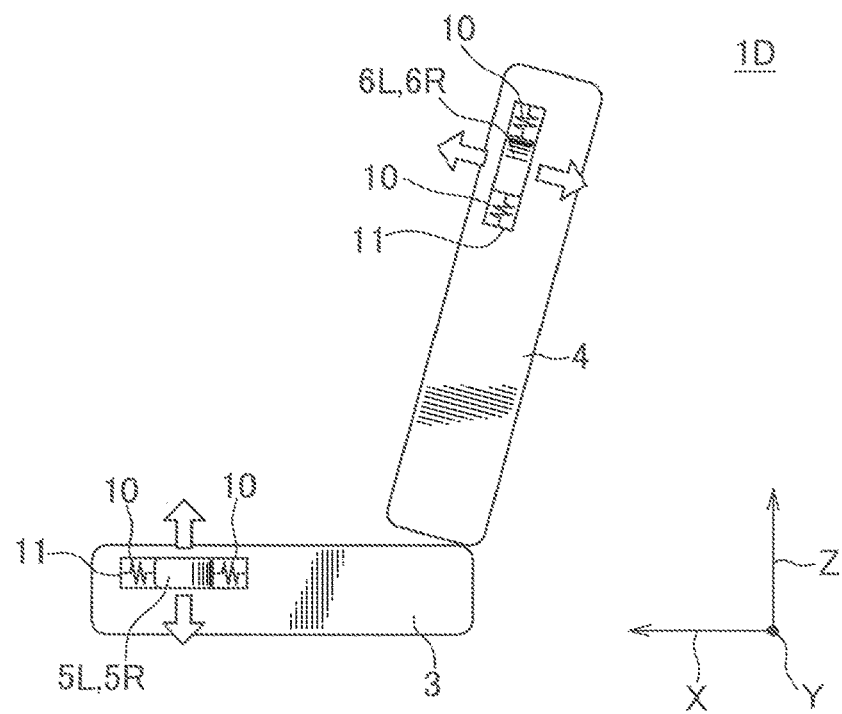
FIG. 10 is an illustration illustrating an effect at the seat of FIG. 8.

Referring to FIGS. 8 to 10, "seat" according to Example 4 of the present invention will be explained. In FIGS. 8 to 10, the same elements as Examples 1 to 3 described above are denoted by the same reference signs to omit explanations thereof.

A seat 1D of this example shown in FIG. 8 includes a seating portion 3, a backrest 4, two pairs of vibrators 5L, 5R, 6L, 6R, a vibration absorbing member (propagation suppressor) 10 provided around each vibrator 5L, 5R, 6L, 6R, a frame 11 supporting the vibration absorbing member 10, and a controller, and constitutes a driver's seat of a vehicle as Example 1.

The vibration absorbing member 10 is a damping spring and three vibration absorbing members 10 are provided per each vibrator 5L, 5R, 6L, 6R. As shown in FIG. 9, this vibration absorbing member 10 has one end attached to an outer circumferential portion of a cylindrical frame 511 and the other end attached to the frame 11. The frame 11 is formed into a cylindrical shape and is arranged at the outer circumference of each vibrator 5L, 5R, 6L, 6R. The three vibration absorbing members 10 are arranged at an equal interval with each other in a circumferential direction of each vibrator 5L, 5R, 6L, 6R. In FIG. 9, only the vibration absorbing member 10 and the frame 11 provided around the vibrator 5L are shown; however, the vibration absorbing members 10 and the frames provided around other vibrators 5R, 6L, 6R have the same configuration as those in FIG. 9. Herein, the vibration absorbing member 10 is schematically shown in FIG. 9.

The vibration absorbing member 10 provided around the vibrator 5R suppresses the vibration of the vibrator 5R located inside thereof from being propagated to the second region E2. The vibration absorbing member 10 provided around the vibrator 5L suppresses the vibration of the vibrator 5L located inside thereof from being propagated to the first region E1. The vibration absorbing member 10 provided around the vibrator 6R suppresses the vibration of the vibrator 6R located inside thereof from being propagated to the second region E4. The vibration absorbing member 10 provided around the vibrator 6L suppresses the vibration of the vibrator 6L located inside thereof from being propagated to the first region E3.

According to the seat 1D having the above-described configuration, the vibration generated by each of the vibrators 5L, 5R, 6L, 6R is propagated well to the seated person side but is suppressed from being propagated in a radial direction of the vibrators 5L, 5R, 6L, 6R by the vibration absorbing member 10 as shown in FIG. 10, allowing the seated person to recognize the position of the vibration source more accurately. That is, whether the vibrating vibrator is the one on the right side or on the left side can be recognized more accurately. Consequently, it is possible to allow the seated person to correctly recognize the information meant by the vibration of each vibrator 5L, 5R, 6L, 6R. Further, by providing the vibration absorbing member 10 around each vibrator 5L, 5R, 6L, 6R, the vibration range of each vibrator 5L, 5R, 6L, 6R can be limited to a narrow range, thereby allowing the seated person to recognize the position of the vibration source more accurately.

The present invention is not limited to Examples 1 to 4 described above, and may include other configurations and the like which can achieve the object of the present invention, and modifications and the like as shown below are also within the present invention.

For example, in Examples 1 to 4 described above, the seat 1A, 1B, 1C, 1D is configured to include two pairs of vibrators 5L, 5R, 6L, 6R; however, the present invention is not limited thereto, and the seat may be configured to include one vibrator arranged in one region and a propagation suppressor for suppressing the vibration of this vibrator from being propagated to the another region. In this case also, it is possible to allow the seated person to recognize the position of the vibration source more accurately.

Further, in Examples 1 to 4 described above, the seating portion 3 and the backrest 4 are configured to have the first region and the second region adjacent to each other in the width direction of the seat, respectively; however, the present invention is not limited thereto, and the seating portion may have a first region and a second region adjacent to each other in the front-rear direction, and/or the backrest may have a first region and a second region adjacent to each other in the up-down direction. Furthermore, the seating portion or the backrest may have a plurality of regions arranged in a lattice-like fashion.

Further, in Examples 1 to 4 described above, the vibration absorbing member 7, 8, the dividing grooves P1, P2, the vibration absorbing member 9 and the vibration absorbing member 10 as the propagation suppressor are employed alone; however, in the present invention, these propagation suppressors of several kinds may be employed in combination. For example, the vibration absorbing member 9 may be provided around the vibrator 5L, 5R of Example 1, so that the vibration absorbing member 9 and the vibration absorbing member 7 together may suppress the propagation of unwanted vibration (vibration propagated in the widthwise direction of the seat) of the vibrators 5L, 5R. Further, the vibration absorbing member 10 and the frame 11 may be provided around the vibrators 5L, 5R of Example 2, so that the vibration absorbing member 10 and the dividing groove P1 together may suppress the propagation of unwanted vibration of the vibrators 5L, 5R.

Further, in Examples 1 to 4 described above, the vibrator is arranged to both of the seating portion 3 and the backrest 4; however, in the present invention, the vibrator may be arranged to only one of the seating portion 3 and the backrest 4.

Further, in Examples 1 to 4 described above, the vibrators 5L, 5R, 6L, 6R were the same in configuration and size; however, in order to obtain the required vibration strength, the vibrator arranged in the backrest 4 and the vibrator arranged in the seating portion 3 may be different in size, or, when the number of vibrators arranged in the backrest 4 and the seating portion 3 is three or more, then the vibrators in the backrest 4 and the seating portion 3 may be different in size.

Further, although Examples 1 to 4 described above illustrate examples in which the seat is configured to be mounted on a vehicle, the seat of the present invention may be a seat other than a seat for a vehicle, such as a seat for a movie theater or a theater.

Preferred configurations, methods, etc. for carrying out the present invention are disclosed in the above description; however, the present invention is not limited thereto. That is, although the present invention has been specifically shown and described with respect to particular examples, a person skilled in the art can make various modifications to the examples described above in terms of shape, material, quantity, and other detailed configurations without departing from the scope of the technical philosophy and object of the present invention. Therefore, the description which limits the shape, material, etc. disclosed above is exemplary for ease of understanding of the present invention, and is not intended to limit the present invention, thus the description in with name of a member not including a part or all of the limitations of its shape, material, etc. is intended to be included in the present invention.

LIST OF REFERENCE SIGNS 1A, 1B, 1C, 1D, 101C seat
5R, 6R vibrator (first vibrator)
5L, 6L vibrator (second vibrator)

7, 8, 9, 10, 109 vibration absorbing member (propagation suppressor)
E1, E3 first region
E2, E4 second region
P1, P2 dividing groove (propagation suppressor)

The invention claimed is:

1. A seat having a first region and another region, comprising:
    a first vibrator arranged in the first region and including a cylindrical frame; and
    a propagation suppressor that suppresses vibration of the first vibrator from being propagated to the another region,
    wherein the propagation suppressor is a vibration absorbing member having an annular shape and that is provided around the cylindrical frame of the first vibrator in a direction of a normal line to a curved surface of the cylindrical frame, and
    wherein the vibration absorbing member formed into the annular shape has a thickness extending from an upper face top to a lower face of a seating portion of the seat or extending from a front face to a rear face of a backrest of the seat to have substantially the same thickness as a thickness of the seating portion or the backrest of the seat.

2. The seat as claimed in claim 1, further comprising:
    a second vibrator arranged in the another region, and
    a second propagation suppressor that suppresses vibration of the second vibrator from being propagated to the first region.

3. The seat as claimed in claim 2, wherein the second propagation suppressor is a vibration absorbing member provided around the second vibrator in a direction substantially perpendicular to the direction of the vibration of the second vibrator, the vibration absorbing member having an annular shape.

4. The seat as claimed in claim 1,
    wherein the propagation suppressor is a first propagation suppressor, the seat further comprising a vibration absorbing member arranged inside the seat at a central portion in a width direction of the seat, and
    wherein the vibration absorbing member is formed into a quadrangular prism shape extending from a front to a rear of a seat portion of the seat or extending from a bottom to a top of a back portion of the seat.

5. The seat as claimed in claim 1, wherein the propagation suppressor further comprises a dividing groove configured to divide an inner member of the seat into right and left portions at the central portion in the width direction of the seat.

6. The seat as claimed in claim 1, wherein the seat is configured to be mounted as a seat of a vehicle.

7. The seat as claimed in claim 2, wherein the propagation suppressor further comprises a dividing groove configured to divide an inner member of the seat into right and left portions at the central portion in the width direction of the seat.

8. The seat as claimed in claim 3, wherein the propagation suppressor further comprises a dividing groove configured to divide an inner member of the seat into right and left portions at the central portion in the width direction of the seat.

9. The seat as claimed in claim 2, wherein the seat is configured to be mounted as a seat of a vehicle.

10. The seat as claimed in claim 3, wherein the seat is configured to be mounted as a seat of a vehicle.

11. The seat as claimed in claim 4, wherein the seat is configured to be mounted as a seat of a vehicle.

12. The seat as claimed in claim 5, wherein the seat is configured to be mounted as a seat of a vehicle.

* * * * *